United States Patent
Hugues et al.

(10) Patent No.: US 7,758,824 B2
(45) Date of Patent: Jul. 20, 2010

(54) INTERNAL EXCHANGER FOR GAS-LIQUID-SOLID FLUIDIZED BED REACTOR EMPLOYING A HIGHLY EXOTHERMIC REACTION

(75) Inventors: Francois Hugues, Vernaison (FR); Bertrand Szymkowiak, Lyons (FR); Jean-Christophe Viguie, Saint Symphorien D'Ozon (FR); Jean-Marc Schweitzer, Villette de Vienne (FR); Michel Munier, Le Chatelet en Brie (FR); Dominique Chretien, Paris (FR); Eric Caprani, Paris (FR); Damien Douziech, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 298 days.

(21) Appl. No.: 11/785,910

(22) Filed: Apr. 20, 2007

(65) Prior Publication Data
US 2008/0000622 A1 Jan. 3, 2008

(30) Foreign Application Priority Data
Apr. 21, 2006 (FR) .................................. 06 03693

(51) Int. Cl.
*F28D 7/00* (2006.01)
*F28D 1/00* (2006.01)
*F28D 7/10* (2006.01)
*F28F 9/22* (2006.01)
*B01J 8/04* (2006.01)
*B01J 10/00* (2006.01)

(52) U.S. Cl. ........................ 422/201; 422/197; 165/157; 165/145; 165/175; 165/76; 165/177

(58) Field of Classification Search .................. 165/157, 165/145, 76, 177, 175; 422/201, 197; 137/15.18, 137/834, 835
See application file for complete search history.

(56) References Cited

U.S. PATENT DOCUMENTS 3,796,547 A * 3/1974 Muenger .................... 422/200
4,060,127 A   11/1977 Savin et al.
4,187,902 A * 2/1980 Miller et al. .................. 165/76

(Continued)

FOREIGN PATENT DOCUMENTS

EP    0038098 A1   10/1981

(Continued)

OTHER PUBLICATIONS

Maretto et al. Design and optimisation of a multi-stage bubble column slurry reactor for Fischer-Tropsch synthesis, 2001, Catalysis Today, 66, 241-248.*

(Continued)

*Primary Examiner*—Walter D Griffin
*Assistant Examiner*—Natasha Young
(74) *Attorney, Agent, or Firm*—Millen, White, Zelano & Branigan, P.C.

(57) ABSTRACT

The present invention describes a novel type of internal exchanger for a gas-liquid-solid fluidized bed reactor employing a strongly thermal reaction. Said exchanger is modular in concept and comprises a central tube with separations allowing both supply of cooling fluid to the pins of the module and collection of partially vaporized fluid from said same pins.

13 Claims, 8 Drawing Sheets

U.S. PATENT DOCUMENTS

| | | | |
|---|---|---|---|
| 4,856,581 A * | 8/1989 | Santoro | 165/130 |
| 5,092,038 A * | 3/1992 | Geppelt et al. | 29/890.048 |
| 5,779,994 A * | 7/1998 | Kupper et al. | 422/197 |
| 6,174,159 B1 * | 1/2001 | Smith et al. | 431/7 |
| 2005/0080147 A1 | 4/2005 | Hawthorne et al. | |

FOREIGN PATENT DOCUMENTS

| | | |
|---|---|---|
| WO | WO 2004/101475 A1 | 11/2004 |
| WO | WO 2005/075065 A1 | 8/2005 |

OTHER PUBLICATIONS

Search Report dated Dec. 14, 2006.

* cited by examiner

INTERNAL EXCHANGER FOR GAS-LIQUID-SOLID FLUIDIZED BED REACTOR EMPLOYING A HIGHLY EXOTHERMIC REACTION

FIELD OF THE INVENTION

The invention relates to a novel type of internal exchanger for an industrial reactor functioning in three-phase fluidized bed mode to carry out a reaction with a strong thermal effect, for example the Fischer-Tropsch reaction, the synthesis of methanol, the benzene hydrogenation reaction, the polymerization of ethylene, or aromatic or aliphatic alkylation. This list is given purely by way of illustration of the various reactions with a strong thermal effect and which can be carried out in a three-phase fluidized bed reactor.

The term "three-phase reactor" means a reactor in which the reaction medium is essentially constituted by a liquid phase traversed by gas bubbles, said liquid phase containing fine solid particles of catalyst in suspension.

When the solid particles are sufficiently fine to be dispersed homogeneously in the liquid phase, the reaction medium is generally termed a "slurry" (a three-phase suspension of gas, solid and liquid) by the skilled person. When the solid particles are larger in size and form a bed having a substantially clean interface with the liquid phase, it is generally termed a three-phase fluidized bed.

The present invention is applicable to both of the above categories, and so in the remainder of the text regarding the reactors of the present invention, we shall refer to three-phase fluidized reactors which encompasses "slurry" type reactors.

The exchange bundle forming the subject matter of the present invention is also easier to handle and enjoys optimized inspection and maintenance phases.

More particularly, the exchange bundle of the invention is designed in a modular manner and can allow removal of any part of the bundle, for example for repair, without having to dismantle the whole of it.

The exchange surface supplied by the exchange bundle is distributed homogeneously throughout the volume of the reactor to ensure perfect temperature control, and said distribution is kept homogeneous or as homogeneous as possible even when part of the bundle is isolated.

EXAMINATION OF PRIOR ART

Three-phase fluidized bed or "slurry" reactors, when carrying out a chemical reaction with a strong thermal effect such as the Fischer-Tropsch synthesis or benzene hydrogenation, are generally provided with an exchanger which is internal to the reactor to evacuate the heat generated by the chemical reaction.

In general, that exchanger can generate medium pressure steam from a water supply. Other fluids may, however, be used without restricting the scope of the invention.

For highly exothermic reactions such as those cited above, the exchange surface to be installed may be very large and the exchange bundle is generally complex. It is usually divided into modules to allow easy handling, particularly in large units as is the case with reactors for carrying out the Fischer-Tropsch reaction.

Such a bundle type is, for example, described in United States patent US-A-2005/0080147 which describes a modular configuration with a traditional supply mode using a distributor with two raked stages.

The exchange surface to be installed to evacuate the heat is usually of the order of 4 to 30 $m^2/m^3$, preferably 4 to 20 $m^2/m^3$ and more preferably 4 to 15 $m^2/m^3$. The volume of the reaction medium is defined as the volume of the reactor reduced by the volume occupied by the exchange bundle and possible baffles which are included in said reactor.

The bubbles present in the reaction medium may generate vibrations in the exchange bundle and the present invention thus envisages maintaining the various portions constituting the exchanger using stiffeners installed at appropriate positions.

The term "stiffeners" means any support which can connect portions of the bundle, either at a pin or between pins or between modules.

BRIEF DESCRIPTION OF THE DRAWINGS

The pins denoted F1 and F2 entering the lower portion of the reactor correspond to the reagent inlets.

FIG. 3 is a top view of the bundle of the invention to show the position of the modules and the central tubes (Tc). Certain modules have an inlet-outlet pin which is made vertical (denoted Vt), other modules have an inlet-outlet pin which is made horizontal (denoted H). The majority, preferably all of the inlet-outlet pins, penetrate or leave the reactor at its upper dome as can be seen in FIG. 1.

FIG. 4 also shows the primary sheets (Fp) and the secondary sheets (Fs) to increase the inertia of the central tube (Tc), as well as certain stiffener elements (Rg).

In FIG. 5, we show pins E1, E2, E3 and E4 reading in the clockwise direction.

BRIEF DESCRIPTION OF THE INVENTION

The present invention concerns a bundle of a heat exchanger which is modular in concept, contained inside a reactor functioning in three-phase fluidized bed mode to carry out reactions with a strong thermal effect such as the Fischer-Tropsch synthesis reaction or the benzene hydrogenation reaction.

A three-phase fluidized bed reactor is generally constituted by a cylindrical shell closed at its upper portion by an upper dome, and at its lower portion by a lower dome provided with means for introducing reaction fluids, the upper dome having means for introducing a cooling fluid and means for evacuating partially vaporized cooling fluid.

The internal exchanger in the three-phase fluidized bed reactor is constituted by an exchange bundle immersed in the reaction medium.

Said exchange bundle is generally constituted by identical modules uniformly distributed in a section of the reactor forming one stage of the modules.

The bundle comprises at least two identical module stages, each module comprising an assembly of identical pins distributed about a central tube common to the assembly of modules aligned vertically in the module under consideration and located at different stages of the bundle.

Said central tube acts both to supply cooling fluid to the pins of the module and to collect partially vaporized fluid from those pins.

The pins of a module and the modules aligned vertically with the module under consideration can be supplied from the common central tube in various manners, and is preferably alternated, as will be defined in more detail below.

The bundle of the present invention is generally constituted by an assembly of identical modules (with the exception of a limited number of modules next to the wall of the reactor which will be described below), said modules being uniformly distributed in a section of the reactor forming a stage of modules, and grouped vertically around a common central tube thus forming a vertical group of modules distributed over the various stages.

The whole of the bundle may thus be obtained by multiplication of the vertical groups of modules, each vertical group of modules being grouped around the same central tube.

This disposition of vertical groups of modules is of particular advantage during interventions requiring removal of one or more pins from a module, regardless of the stage concerned, even the lower stage of the reactor.

A procedure for access to said pin or to said module is described and forms part of the present invention.

DETAILED DESCRIPTION OF THE INVENTION

The exchange bundle of the present invention is modular in concept, i.e. it is constituted by mainly identical modules with the exception of modules next to the wall which may be of a different type.

Each module comprises a number of identical pins surrounding a central tube, said central tube acting to supply the pins of the module with cooling fluid and collect partially vaporized fluid from those same pins. The central tubes are denoted Tc in the various Figures in which they appear.

The pins of each module are evenly distributed about the central tube acting to supply them. Each pin is constituted by a line or pipe which is preferably cylindrical, extending vertically and effecting a certain number of vertical passes and returns, each pass being connected to each return by a U-shaped portion or U-bend. A pass and return assembly is generally termed a "pass" by the skilled person.

Figure 5A:
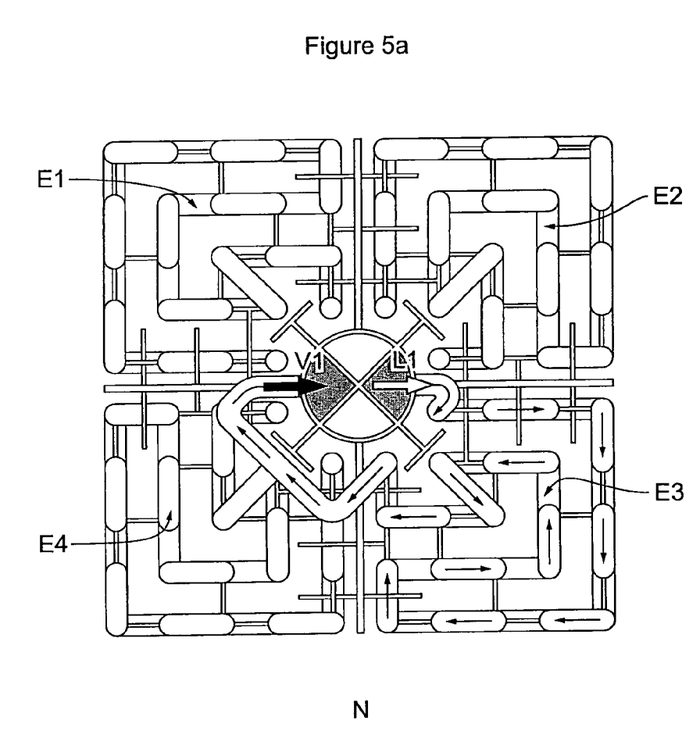
FIG. 5 is a top view of a module to show the supply to the pins more clearly in a first circuit (FIG. 5a) and a second circuit (FIG. 5b) at two successive stages denoted N and N+1. The features of the first and second circuit are described in more detail in the detailed description.
Figure 5B:
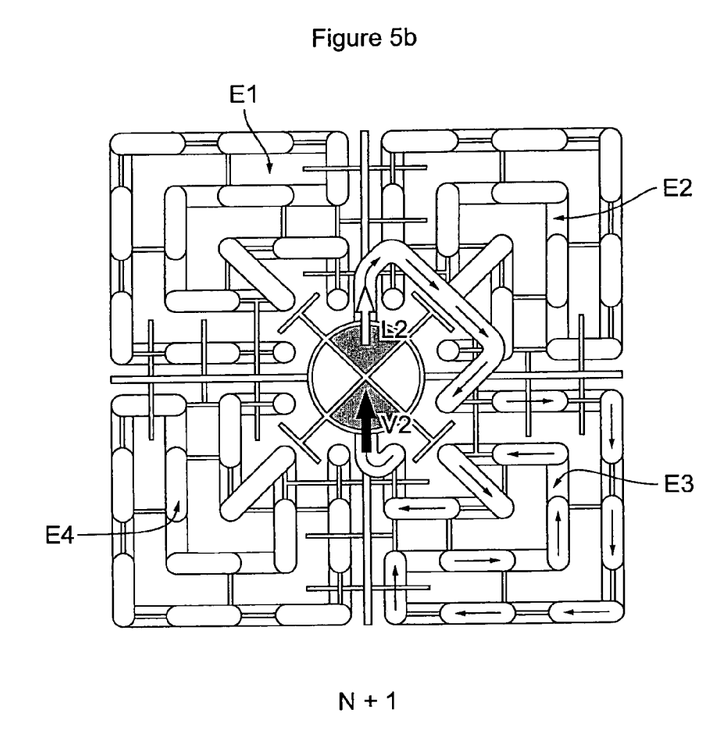

FIGS. 5a and 5b show a view of a configuration of 4 pins surrounding the central tube. Each pin is in the form of vertical passes and returns to occupy, in a regular manner, a space around the central tube which in this case corresponds to a dial. 4 dials can be seen in FIGS. 5a and 5b, corresponding to the pins denoted E1, E2, E3 and E4 which are conventionally numbered in the clockwise direction.

Supply of cooling fluid to a given pin is carried out via a sector of the central tube and the partially vaporized cooling fluid is collected in another sector of the central tube which is distinct from the supply sector.

The assembly of modules of a given stage also generally covers the section of the reactor and forms one module stage. In general, the number of modules per stage is in the range 4 to 80, preferably in the range 40 to 70, and more preferably in the range 45 to 65.

For a given reactor, the number of modules per stage depends on the size of the module.

Preferably, the number of pins per module is even and equal to 2, 4, 6 or 8.

Said pins may, for example, have an external section which is generally square and thus form a module with a general section in the form of a quadrilateral when they are 4 in number.

They may also have an external generally triangular shape in section to form a module with an external generally hexagonal section when they are 6 in number, or octagonal when they are 8 in number.

In the particular case of a module constituted by 4 pins, the number of modules per stage will be in the range 0.4 to 0.7 modules per square metre of section of the reactor, and preferably in the range 0.45 to 0.65 modules per square metre of section of reactor.

The modules are distributed in various stages, generally 1 to 10, preferably 1 to 6, and more preferably 2 to 4 stages, or even 4 stages to cover the entire height of the reactor.

The stages are separated by an empty space which is in the range 0.8 to 1.5 metres high.

Said space allows inspection of all of the weld points of the modules.

During a maintenance stand down, a man may access the inter-stage space, inspect the welds, and carry out minor maintenance operations in situ without having to dismantle.

The central tube of a module belonging to a stage N is extended to the next stage N+1 so that the central tube is common to all of the modules located at the various stages along the same vertical. This assembly of vertically aligned modules is termed a vertical module group.

In the case of a cylindrical reactor with a constant diameter, each stage of the bundle is thus preferably constituted by a number of identical modules, termed a standard module, with the exception of certain modules which are next to the wall of the reactor which have fewer pins than the standard modules. However, it is possible to use different modules in the case in which particular baffles are incorporated into the cylindrical reactor, or in the case in which said reactor has variations in its diameter or shape along its height.

Preferably, the standard modules of each stage thus function in parallel and have a same number of pins.

The non-standard modules are generally located along the walls of the reactor. Because of the cylindrical shape of these walls, a non-standard module will have fewer pins than a standard module. As an example, for standard modules comprising 4 pins, a non-standard module may include 3, 2 or even 1 pins. The principle for supplying each pin via a central tube common to the various pins of a non-standard module is the same, though. There is no substantial difference between a pin forming part of a standard module and a pin forming part of a non-standard module.

The non-standard modules generally represent less than 35%, and usually less than 30% of the assembly of modules. Their general design is of the same type as that of standard modules, simply with a reduced number of pins per module. They may not respect the principle of alternated supply, which is preferred for standard modules.

Supply via the central tube of the pins of a module and the modules aligned vertically with the module under consideration is preferably alternated between two adjacent pins, either within one module or between two consecutive stages.

Said central tube provides a mechanical support for the modules and supplies the pins with cooling fluid and collects said partially vaporized fluid from the pin outlets. Thus it has both a mechanical and a hydraulic function.

Figure 4:
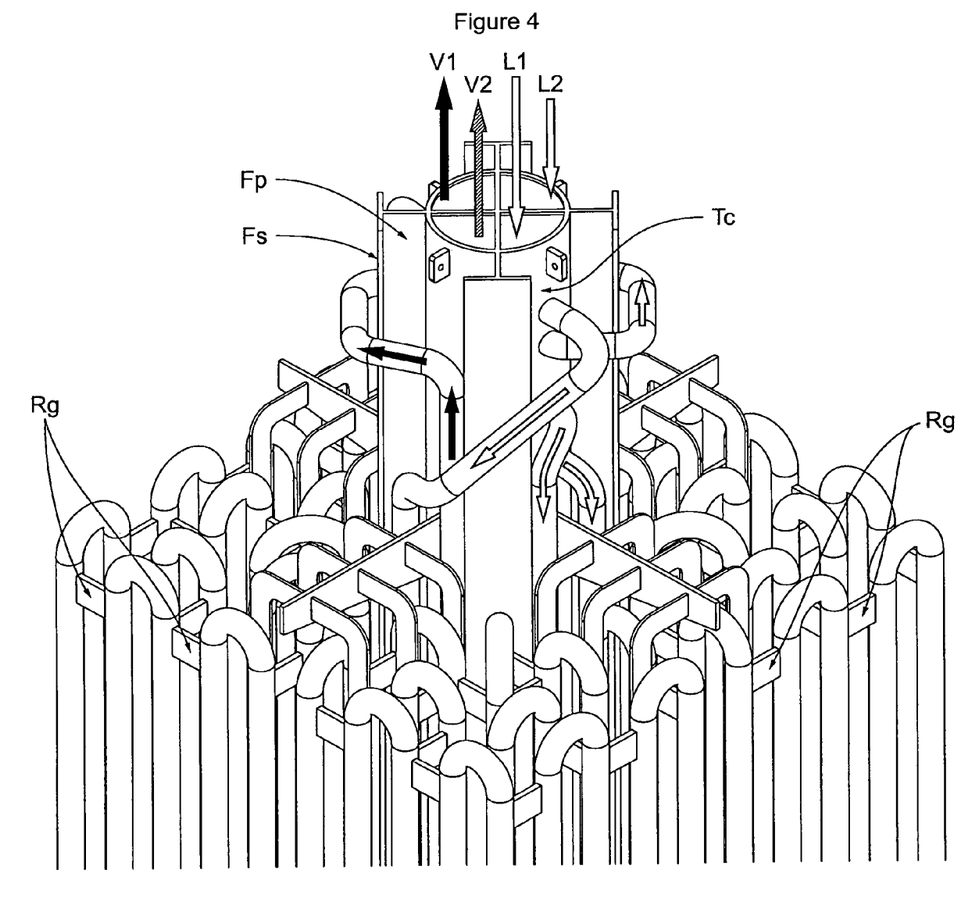
FIG. 4 is a view of the upper portion of a module in perspective to show the pins constituting a module and surrounding the central tube, as well as the division of the central tube into two independent circuits (L1/V1, L2/V2).

From a mechanical viewpoint, the central tube is preferably stiffened by an internal wall which defines the various supply circuits. Its inertia is also preferably augmented by primary sheets (Fp) extending outside the internal walls, and extending of the whole length of said tube, as can be seen in FIG. 4. Said primary sheets (Fp) are constituted by leaves perpendicular to the cylindrical wall of the central tube (Tc) and welded along said wall.

The primary sheets (Fp) next to a central tube (Tc) may optionally be extended by other vertical elements or secondary sheets (Fs) as shown in FIG. 4, to form a T shape with the primary sheet (Fp).

The assembly formed by the primary sheets (Fp) and the secondary sheets (Fs) augments the inertia of the central tube and thus limits the amplitude of vibrations which may occur because of the reaction medium in which it is immersed.

The walled central tube and the primary sheets are generally constructed from 4 leaves disposed in a perpendicular manner on which a quarter-cylinder positioned between two consecutive leaves will be welded.

Figure 6:
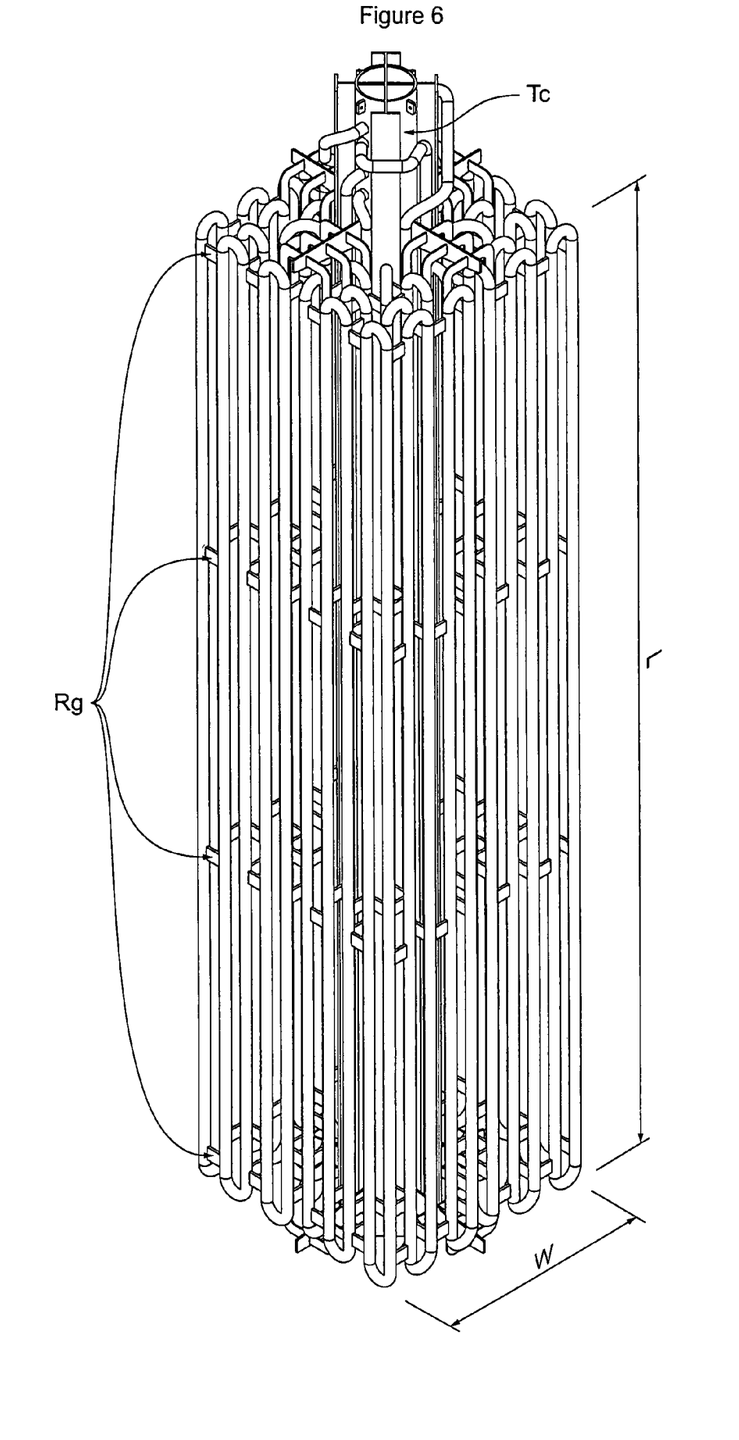
FIG. 6 is a view of the whole of a module constituting the bundle which shows the position of the various stiffener elements of said module (denoted Rg), and shows the dimensions L (height of a module) and W (width of a module).

The 4 quarter-cylinders correctly positioned in alignment with each other form the central tube. The portion of the 4 leaves inside the central tube forms the internal walls of the central tube, and the portion of the 4 leaves outside the central tube form the primary sheets. The pins constituting a module may be connected together using stiffener elements (Rg), as shown in FIG. 6.

Figure 7A:
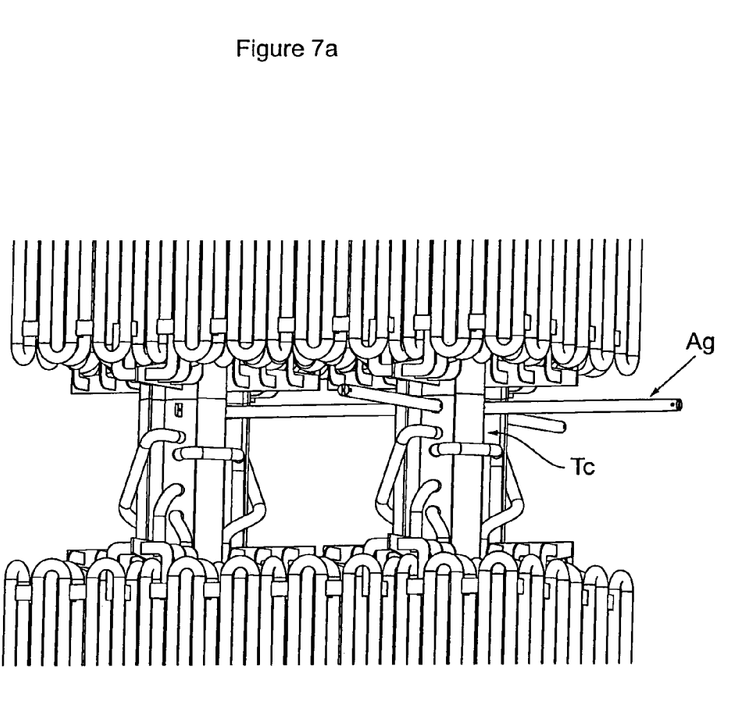
FIG. 7 is a view of the inter-stage space to show a system of stiffeners (Ag) between the central tubes.
Figure 7B:
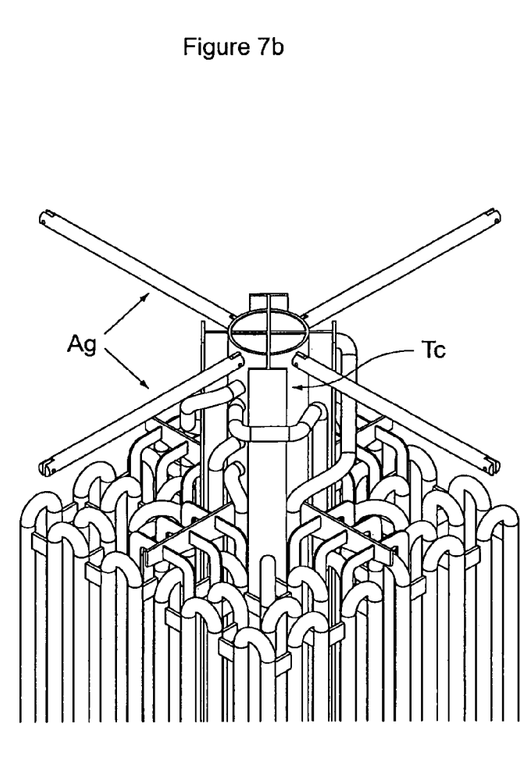

In the same manner, the stiffener elements (Ag) can connect together two central tubes at the space between the stages, as can be seen in FIG. 7.

Any other stiffening system using elements connecting the various portions of a module is compatible with the present invention.

Preferably, the majority of said central tubes are fixed to the upper dome of the reactor, although they generally run in a sheath at the foot of the reactor, to guide relative displacements between the central tubes and the reactor due to thermal expansion phenomena.

Preferably, other central tubes are welded to the lower dome of the reactor, in this case the thermal expansion effects being accommodated by positioning an expansion ring of a particular size and positioned at the head of the central tubes.

The following description of a particular embodiment of the invention is given for a standard module comprising 4 pins and for a 4-stage reactor configuration.

The central tube of a given module is connected to the pins of said module via communication means which can introduce the supply fluid to the interior of each of the pin, and recover partially vaporized fluid from those pins.

Figure 8:
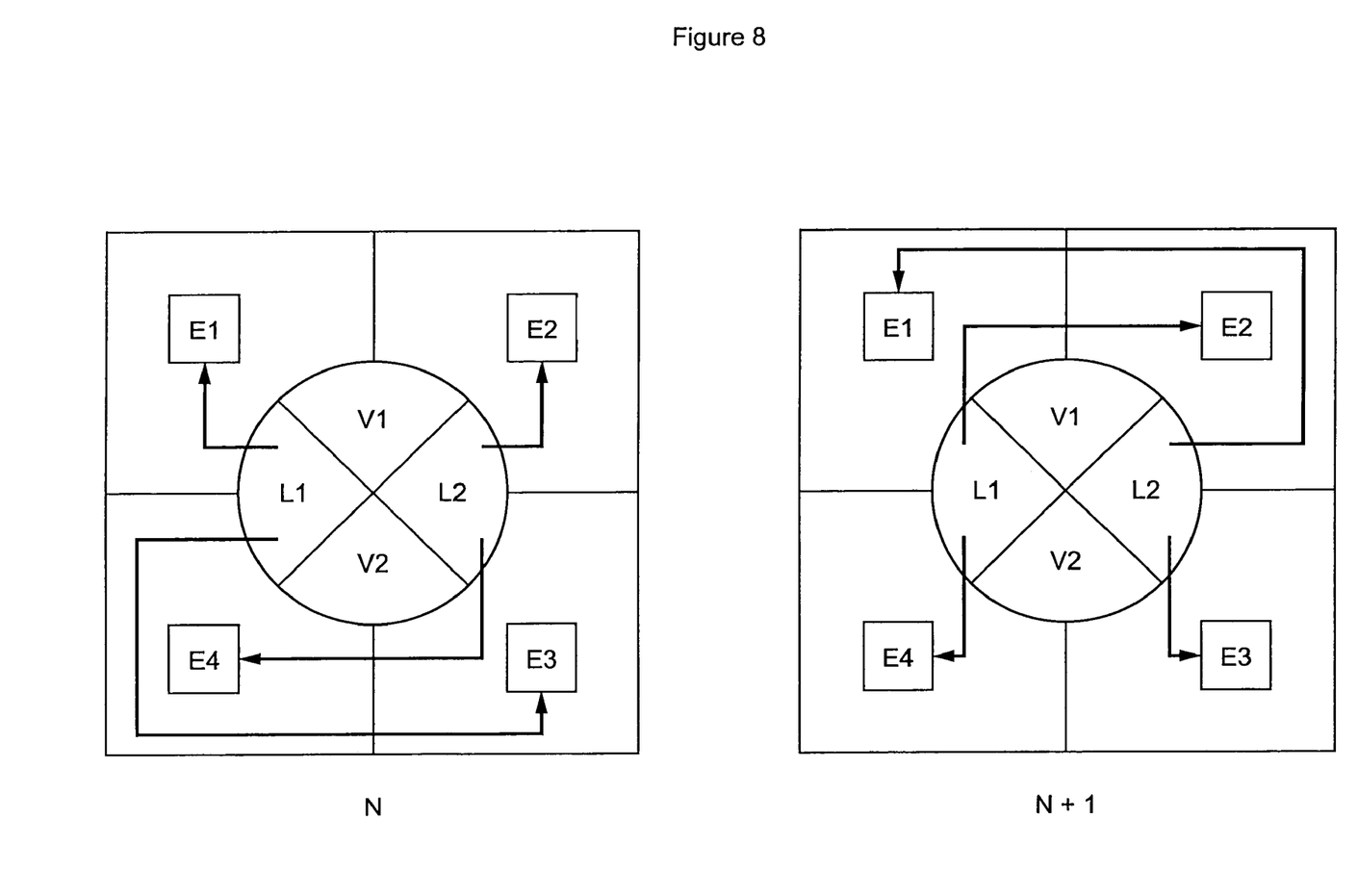
FIG. 8 is a diagrammatic representation of the pins of a bundle over two successive stages denoted N and N+1 to illustrate the "alternated" supply mode.

FIG. 8 diagrammatically shows a central tube extending over 2 consecutive stages denoted N and N+1, each module comprising 4 pins denoted E1, E2, E3, E4 reading in the clockwise direction.

The central tube is generally divided into 2 independent circuits either by an internal crosspiece or by any other division means which can produce at least two independent circuits. As an example, it may be a tube which is coaxial with the central tube located inside said central tube and divided into two by a vertical wall, the annular portion between the central tube and the internal tube itself being divided in two by two vertical walls. Such a device also defines two independent circuits, a first circuit via the internal tube and a second circuit via the annular zone between the internal tube and the central tube.

The invention is not limited by the means for dividing the central tube into different sectors to define independent circuits.

The present invention is compatible with more than 2 independent circuits, provided that it is still possible to define an "alternated" supply plan for the pins, as will be described below.

The scope of the invention encompasses dividing the central tube into more than two independent circuits, for example 3 independent circuits, with a supply mode adapted to the pins forming a module, but for reasons of clarity, the description below describes two independent circuits.

In the remainder of the text, we shall describe the particular case of a division means constituted by an internal crosspiece defining 4 equal sectors extending over the total height of the central tube and defining two independent circuits. Preferably, the number of independent circuits per central tube is thus two.

The internal crosspiece thus divides the interior volume of the central tube into 4 identical sectors which are paired into (L1/V1) for the first circuit and (L2/V2) for the second circuit. For the first circuit L1/V1, the portion L1 corresponds to the supply of liquid cooling fluid, and the portion V1 corresponds to the return of the partially vaporized cooling fluid.

Portions L1 and V1 are not in communication over the central tube. The portion L1 drops vertically with the liquid cooling fluid, and portion V1 rises vertically with the partially vaporized cooling fluid.

In the same manner, for the second circuit L2/V2, the portion L2 corresponds to the supply of liquid cooling fluid and the portion V2 corresponds to the return of partially vaporized cooling fluid. For simplification, we shall designate the first circuit L1 and the second circuit L2.

The description will be better understood from a study of the diagrammatic representation shown in FIG. 8.

In this particular implementation of the invention, the first circuit L1 supplies the two pins 1 and 3 located at stage N and the second circuit L2 supplies the other 2 pins of that same stage, namely pins 2 and 4. In the next stage denoted N+1, the circuit L1 supplies the two pins 2 and 4, and the second circuit L2 supplies the other two pins 1 and 3.

It will thus be understood that this mode of connection between the central tube and the pins of the module surrounding the central tube at consecutive stages N and N+1 can produce alternation in the sense that, if the various pins of a vertical group of a module are considered, the various vertically aligned pins from one stage to the next are alternately supplied by circuit L1 and circuit L2.

Similarly, for each module, half of the pins is supplied via circuit L1 and the other half is supplied via circuit L2. In this example, two diagonal pins are supplied via the same circuit, corresponding to the preferred configuration.

However, the scope of the invention also encompasses supplying two adjacent pins, for example 1 and 2, via circuit L1 and pins 3 and 4 via circuit L2. In the next stage, circuit L1 will supply pins 3 and 4 and circuit L2 will supply pins 1 and 2.

In general, the central tube can, via its 2 independent circuits, allow supply of half of the pins via its first circuit and the other half of the pins via its other circuit, the two pin halves being defined as desired.

Preferably, the "alternated" supply mode can produce an alternated supply in that the 2 pins supplied by circuit L1 at a stage N are supplied via the same circuit L1 at stage N+2, and the other two pins supplied via circuit L2 at stage N are supplied by the same circuit L2 at stage N+2.

The fact of disposing two independent circuits on each central tube allows also, if necessary, a circuit to be closed, which stops the circulation over half of the pins of a given stage, and retains circulation over the other half of the pins.

Since this is carried out in an alternating manner from one stage to the next, a certain homogeneity of distribution of the pins is maintained as they function over the entire volume of the reactor. Isolation of a circuit L1 or L2 can optionally be carried out from outside the reactor by manipulating valves located on each of the circuits. In the case of a leak from a pin, it is then possible to isolate circuit L1 or L2 which supplies that pin, while the unit continues to function normally. In circuits L1 and L2, between each stage, a flow element may be installed to ensure an identical flow of cooling fluid between each module.

Figure 1:
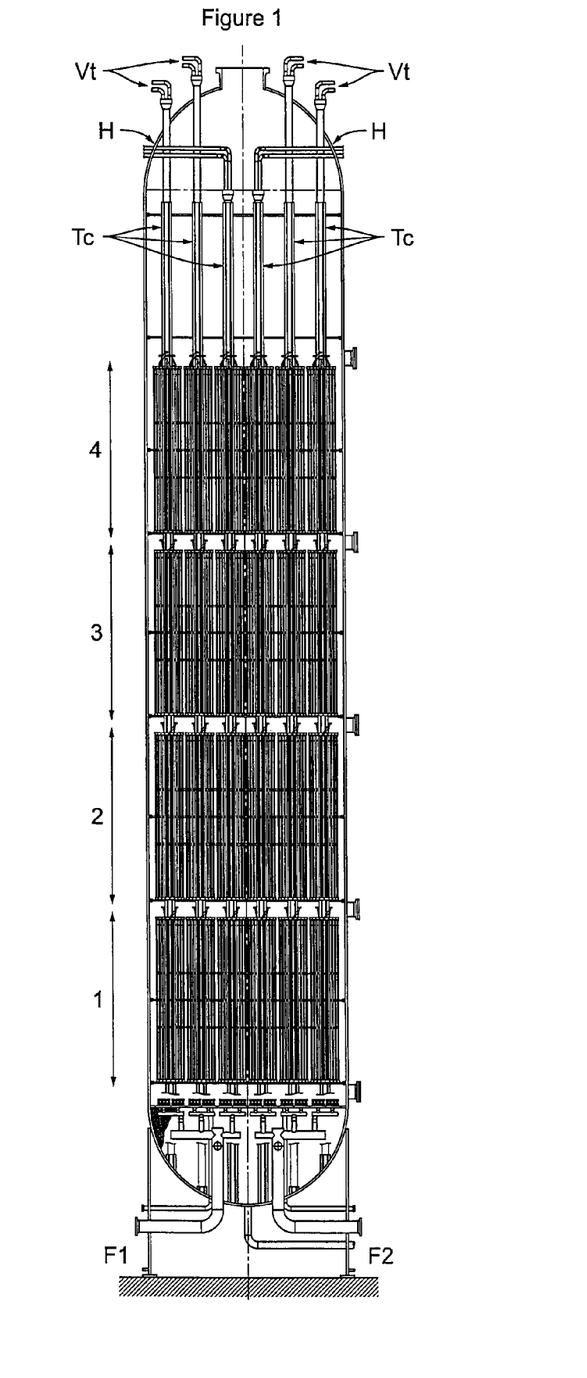
FIG. 1 is a view of the whole of a three-phase fluidized reactor to show the general disposition of the exchange bundle spread over several stages denoted 1, 2, 3 and 4, numbered conventionally from bottom to top.
Figure 2:
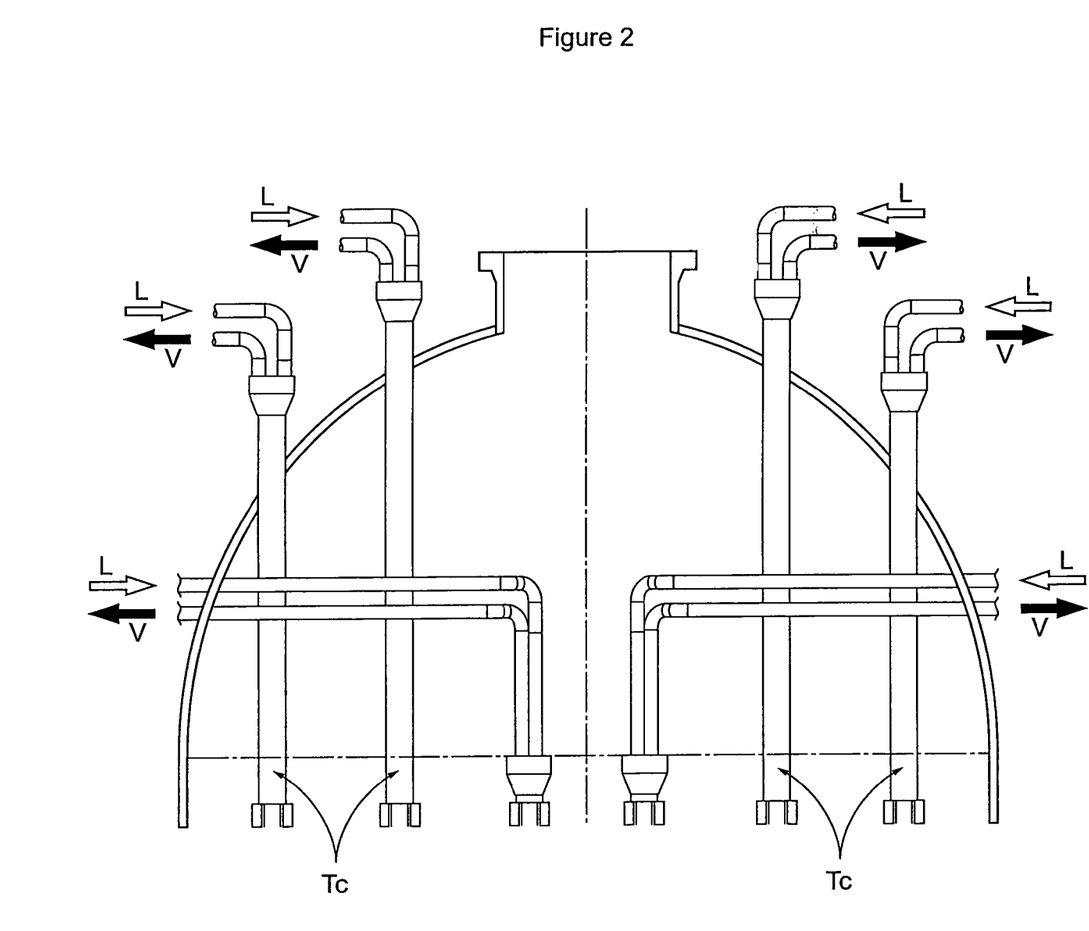
FIG. 2 is a view of the upper portion of the reactor to show the ends of the central tubes (Tc) serving to supply the bundle with cooling fluid (denoted L) and to remove partially vaporized cooling fluid (denoted V).
Figure 3:
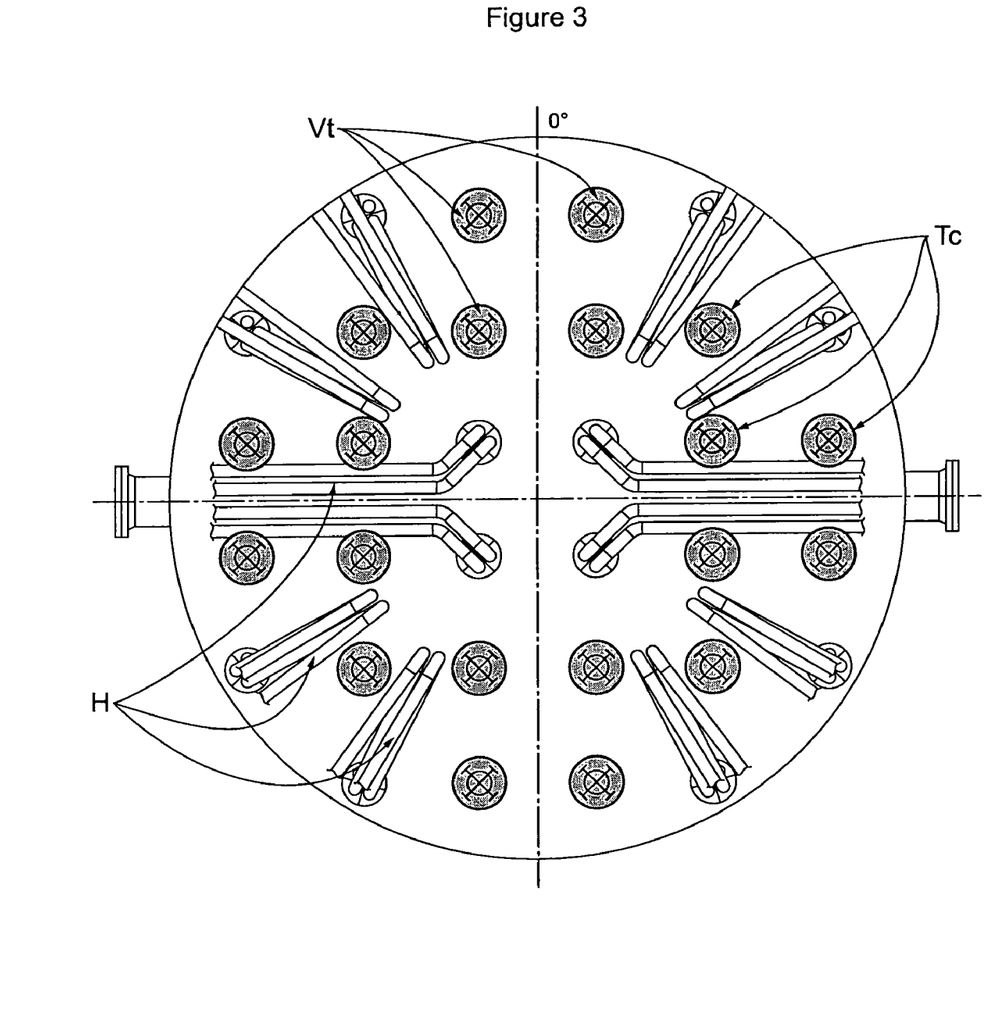

To generalize the above description of a particular case, we shall use a two-index notation to identify each pin Eij of a given module, the first index i denoting the number of the pin forming part of a given module or the position of the pin denoted 1, 2, 3, 4, reading in the clockwise direction (as in FIG. 6), and the second index j denoting the number of the stage under consideration, denoted 1, 2, 3, 4 from bottom to top of the reactor (see FIG. 1).

In the case of equivalence of standard modules located on a given stage, the two-index notation is sufficient to identify any pin of the bundle. As an example, the pins E11, E21, E31, E41 denote the 4 pins located on a given module of the first stage starting from the pin located in position 1 and reading clockwise.

Pins E11, E12, E13, E14 denote the 4 pins in position 1, which are aligned vertically when passing in succession through stages 1, 2, 3 and 4.

Thus, from Table 1, we can define a supply plan designating the supply circuit L1 or L2 at each pin Eij. A pin supplied via circuit L1 will generate an at least partially vaporized fluid which is recovered in circuit V1. For simplification, we shall talk of circuit L1, but the complete circuit comprises the supply circuit L1 and the collection for the partially vaporized fluid using circuit V1. This is the same for L2 and V2.

Thus, in Table 1 for supply in accordance with a preferred implementation of the invention, we observe alternating supply circuits L1 and L2, reading in the direction of two consecutive pins, either in the clockwise direction within a given module or in the vertical direction from one stage to the other, which are never supplied by the same circuit.

The expression "alternated supply" should thus be understood in this manner. The supply to pins of the heat exchange bundle of the invention is, in this preferred implementation, alternated between two adjacent pins, either within the same module or between two consecutive stages.

TABLE 1

Alternated supply

| E11 (L1) | E21 (L2) | E31 (L1) | E41 (L2) |
| E21 (L2) | E22 (L1) | E23 (L2) | E24 (L1) |
| E31 (L1) | E32 (L2) | E33 (L1) | E34 (L2) |
| E41 (L2) | E42 L1) | E43 (L2) | E44 (L1) |

The aligned vertical disposition of the modules is particularly advantageous when a pin has to be removed from the reactor as, by considering a pin located at any stage of the reactor, it is sufficient to remove the pin or pins located vertically to the pin under consideration without touching the other pins of the bundle located at the same level or at a lower level (removal from the top) or a higher level (removal from the bottom).

Further, if the circulation of fluid is to be stopped in a given module, it is possible to close a circuit L1 or L2 and leave the other operating, which on each module keeps half the pins in operation and thus retains homogeneity in the distribution of functioning pins.

To dismantle a pin located at the lower stage (denoted 1, see FIG. 1) of the reactor, an example of the various operations to be carried out is given below.

A crane, hoist or other lifting equipment is installed over the reactor.

The distance which separates the lifting equipment from the head of the reactor is greater than the length of a pin. A manhole with an opening having a dimension larger than the width of a pin is provided in the dome head or the lower portion of the reactor.

Thus, for example, in the case of removing a pin from the top of the reactor, the upper portion of the reactor is permanently provided with a beam, the distance separating said beam from the head of the pin upper being greater than the length of one pin.

Temporary beams are installed in the reactor once it has been stopped, inerted and opened to the atmosphere, said beams forming a kind of grid covering the reactor section and cooperating with the permanent beam. Using said grid, temporary lifting equipment (for example a block and tackle or hoist) may be installed in the reactor and is displaced in a horizontal plane above the modules.

To dismantle a defective pin located at the bottom of the reactor, for example pin E11, it is sufficient to first dismantle the pins which are above it, namely E14, then E13 and E12. To this end, the skilled person will attach pin E14 to the lifting means located inside using sling lines, for example.

In a second step, the welds connecting pin E14 to the central tube are cut. The welds of the lower and upper support elements are also cut. Pin E14 is removed from its original module using the lifting equipment inside the reactor. Once removed from the exchanger assembly, the hoist and the pin are displaced on the grid formed by the temporary beams to position the pin beneath the upper manhole of the reactor. In this position, the pin E14 can be removed from the reactor using the external lifting system. The pin E13 may be removed from the reactor using the same procedure. The pin E12 may be removed from the reactor using the same procedure. Since access to pin E11 is now free, it is then possible to remove the pin E11 using the same procedure as for pins E14, E13 and E12.

If necessary, the process may then be reversed if the defective original pin E11 is replaced by a new pin, and in particular to reposition pins E12 to E14 before starting up the reactor again.

Thus, the invention also concerns a method for removing a pin E11 from a three-phase fluidized bed reactor comprising an exchange bundle in accordance with the present description, comprising the following steps:

a) attaching the pin E14, located vertically to the pin E11 in stage 4, by means of a lifting means located inside the reactor using sling lines;

b) cutting the welds connecting the pin E14 to the central tube of the corresponding module, the welds of the lower and upper support elements around the pin E14 then also being cut;

c) withdrawing the pin E14 from its original module using lifting equipment inside the reactor and displacing said pin over the grid formed by temporary beams to position it beneath the upper manhole of the reactor;
d) removing said pin E14 from the reactor using an external lifting system;
e) removing the pin E13 from the reactor in the same manner as in steps a) to c);
f) removing the pin E12 from the reactor in the same manner as in steps a) to c);
g) removing the pin E11 from the reactor in the same manner as in steps a) to c).

Example of the Invention

The example below concerns an industrial three-phase fluidized bed reactor to carry out the hydrogenation of benzene under the following operating conditions:
Temperature: 200° C.;
Pressure: 4 MPa (40 bars, 1 bar=$10^5$ pascals);
Raney nickel-based catalyst in the form of solid particles with a diameter in the range 1 to 50 microns;
Flow rate of feed to be treated: 1600 kg/hour;
Hydrogen flow rate: 165 kg/hour;
Flow rate of water to be vaporized: 2200 kg/hour to generate medium pressure steam (1.5 MPa).

A module has 4 pins: each pin consists of a vertical line carrying out 6 vertical passes and returns, each pass and return being separated by a U-shaped portion of line. Each pass (or return) is 3 metres long.

Each vertical line is constituted by a tube with an external diameter of 60.3 mm and an internal diameter of 52.5 mm. The total size of a module is 3.5 metres high and 1.5 metres wide.

The central tube of a module has an external diameter of 114.3 mm and an internal diameter of 102.3 mm. There are 8 identical modules per stage and 10 stages which define a total exchange surface of about 400 $m^2$ allowing the heat released to be evacuated.

The pin supply plan is an alternating plan in accordance with Table 1 of the detailed description.

The invention claimed is:

1. A heat exchange bundle contained inside a three-phase fluidized bed reactor constituted by a shell and provided with means for introducing reaction fluids, means for introducing a cooling fluid and means for evacuating partially vaporized cooling fluid, said bundle comprising at least two identical stages of modules, each module comprising an assembly of pins configured as similar pipes connected to one another in series by U-bend turns, the pipes being distributed around a central tube common to the module under consideration and to an assembly of modules aligned vertically with the module under consideration over the stages of the bundle, in which said central tube acts both to supply the pipes of the module with cooling fluid and to collect partially vaporized fluid from said same pipes.

2. A heat exchange bundle according to claim 1, in which the supply of the pipes of said bundle is alternated between two adjacent pins pipes either within the same module or between two consecutive stages of the bundle.

3. A heat exchange bundle according to claim 1, in which the exchange surface per unit volume of reaction medium is in the range 4 to 30 $m^2/m^3$.

4. A heat exchange bundle according to claim 1, in which the number of pins per module is equal to 2, 4, 6 or 8.

5. A heat exchange bundle according to claim 1, in which the number of stages is in the range 2 to 6.

6. A heat exchange bundle according to claim 1, in which the number of pins per module is equal to 4.

7. A heat exchange bundle according to claim 1, in which the number of modules per stage is in the range 4 to 80.

8. A heat exchange bundle according to claim 1, in which the central tube is divided by an internal crosspiece defining 4 equal vertical sectors, to define two independent circuits for supplying cooling liquid and recovering partially vaporized cooling liquid.

9. A heat exchange bundle according to claim 1, in which the pins of each module comprise in the range 10 to 50 vertical paths or passes.

10. A heat exchange bundle according to claim 1, in which each central tube of a module comprises primary sheets welded along the external wall of said central tube and extending along the whole length of said wall to increase the inertia.

11. A heat exchange bundle according to claim 10, in which in addition to the primary sheets, each central tube is provided with secondary sheets welded to the primary sheets to produce a T-shape in combination with the primary sheets.

12. A heat exchange bundle according to claim 10 wherein the exchange surface per unit volume is in the range of 4 to 10 $m^2/m^3$.

13. A heat exchange bundle according to claim 10 wherein the exchange surface per unit volume is in the range of 4 to 15 $m^2/m^3$.

* * * * *